Patented Nov. 15, 1949

2,488,332

UNITED STATES PATENT OFFICE 2,488,332

METHOD OF MAKING A PHENOLIC RESIN METAL CONTAINING MOLDING COMPOSITION

William P. Roush, Pittsburgh, Pa.

No Drawing. Application January 31, 1947, Serial No. 725,731

3 Claims. (Cl. 260—38)

This invention relates to synthetic resins such as are commonly termed plastics, and more particularly to composite plastics consisting of resin and metal particles having decorative, electrical and mechanical properties adapted to a variety of uses.

It is well known in the art that synthetic resins such as the well known phenolic condensation products may be compounded with fillers, such as wood flour, paper, fabrics and the like, such fillers constituting the body of the finished product in which the resin is the binder that becomes infusible upon solidification in its final molding operation.

In accordance with the present invention the molding composition contains metal particles and resinous materials, such, for example, as aluminum powder or flake, also bronzing powders and copper, iron or other highly conducting metals in flake or powder form to form molded articles of highly decorative surface finishes and of desirable physical or electrical properties. The invention distinguishes from the prior art mainly in that the composite metal and resinous product is combined in the preparation of the molding composition per se, and is not merely added or suspended as in conventional practice.

For example, a typical molding composition embodying the principles of this invention may consist of 103 parts of phenol and 14 parts of hexamethylenetetramine heated together at 130° C., the reaction being exothermic, and increasing the temperature to about 180° C. During the reaction ammonia is evolved and when it ceases to come off the reaction product is again heated at 185° C. for four hours for driving off most of the nitrogen. The resultant resin is permanently fusible and is used as the base stock for the preparation of the composite metal resin compound.

To the base thus formed held at a temperature of 150° C. there is added 12 parts of aluminum powder, the powder being added slowly with good agitation. Thus the ratio is ten parts of resin to one part of metal powder which may be varied in accordance with the color of the resin, whether light or dark.

The mixture is cooled to 105° C. and 15 parts of formaldehyde in the form of a 40% solution, and ½ part of hexamethylenetetramine are added. Also 3 parts of aluminum stearate are added as a lubricating agent. The mixture is held at 105° C. for approximately two hours or as long as the material is viscous with strong agitation to eliminate all water present. It is then cooled and held at 70° C. until hardening takes place. The hard material is cooled completely and is broken up and finely ground to constitute the finished molding compound which is in an advanced stage of infusibility. The molding composition will not actually melt at any temperature, but above 130° C. it will soften sufficiently to flow properly in a mold at a temperature of approximately 160° C., the molding step embodying generally the same technique as with conventional phenolic molding preparations.

Articles made of this composition when of thin cross section will harden in one or two minutes and the finished product may be ejected from the mold without cooling. The metal particles of the composition appear on the surface of the finished product, lending to it the appearance of a highly polished metal article. It thus distinguishes from the use of compositions employing fillers in which such fillers do not appear on the surface of the finished article and in which considerable care is exercised to prevent the filler from showing on the surface and marring the finish. In the composition of the present invention the metal particles produce the desired surface appearance and the resins cement the particles together and give the object the necessary strength.

The only limit on the ratio of metal to resin is therefore enough metal to overcome the color of the resin and produce the desired metallic finish. With a light colored resin as little as one part metal to 25 parts of resin has been found to be sufficient as distinguished from the ten to one ratio of the above example. By using a light colored resin dyed to a brilliant color and a small amount of metal powder, such as one part of metal powder with 50 parts by weight of resin, the resultant product when molded will have a highly lustrous metallic finish with a colored sheen and an appearance of depth.

By using a molding composition of resin and electrical conducting metal powders, such as copper, aluminum, iron and the like, it is possible to produce articles possessing valuable electrical properties. By carefully controlling the proportion of metal to resin it is possible to produce objects of definite desired conductivity. Each particle of metal is enveloped in a film of resin which is not a perfect electrical insulator and is capable of transmitting a certain amount of current. The higher the proportion of metal powder in the composition the closer the metal particles are packed and the thinner will be the resinous film therebetween, so that the finished article will have greater current conductivity. An electrical application for such products would be an inexpensive rheostat or resistor. Another is the fabrication of electric condensers. Ordinary phenolic condensation products are well known for their dielectric properties and are well adapted for such application.

Another application is the fabrication of noninductive resistors for high frequency work. The low loss polystyrenes are well known for their dielectric strength in this field and may be used as a resinous binder for the metallic resin composition. Also for use of the material in electrical application the proportion of metal to resin is far greater than in composite structures for ornamental surface decorative uses. For example, in electrical application about one part of metal powder or flake is used to two parts of resin, or about five parts of metal to one part of resin may be used, depending upon the electrical conditions of the application and the size and shape of the article. With the larger proportions of metal to resin care must be exercised to coat each metal particle with the resin to provide the necessary mechanical strength.

Because of the physical and mechanical properties of the composite metal resinous products described above, they may be utilized as gears, pulleys, couplings, etc., they being heat resistant and superior in surface abrasion resistance. Articles may be machined from a suitable precast or molded blank.

Another advantage of the composite metal resin materials is that they cure faster due to the greater conductivity of the metal compounded material.

It is evident from the foregoing description of the invention that composite metal resinous bodies having a metallic appearance may be formed by initially preparing a base stock in fusible state and adding metallic powder or flake. Compositions with small metal content require no special technique for blending with the resin. For larger metal contents it is best to add the metal to molten resin during preparation to insure that each metal particle is completely coated so as to give to the final product the chemical properties of the resin with which the metal particles are compounded. The composite metal and resin molding compositions may also be blended by precipitating resin onto the metal particles from solution or kneading on hot rolls or in a Danbury mixer.

The composition of metal and resin can be varied in proportion and substance to produce desired surface finish or electrical, physical and mechanical properties adapting it to a variety of uses. Also, two or more tone effects are possible through use of different metals, such as aluminum powder and resin composition inlaid on a bronze powder and resin composition.

Although several embodiments of the invention have been illustrated and described, it will be evident to those skilled in the art that various modifications may be made in the details of construction without departing from the principles herein set forth.

I claim:

1. The method of making a molding composition which comprises heating 103 parts of phenol and 14 parts of hexamethylenetetramine at 130° C. until ammonia ceases to come off, reheating the reaction product at 185° C. for approximately four hours to drive off most of the nitrogen, reducing the temperature of the above base resin to 150° C., slowly adding from 5 to 12 parts of metal particles with good agitation, cooling the mixture to 105° C., adding 15 parts of a forty per cent solution of formaldehyde, ½ part hexamethylenetetramine and 3 parts aluminum stearate, strongly agitating the mixture to remove all water, cooling the mixture to 70° C. to harden the same, and then breaking and grinding the hardened composition to the desired mesh size of a molding mixture.

2. The method of making a molding composition which comprises initially preparing a base stock consisting of 103 parts of phenol and 14 parts of hexamethylenetetramine heated together at 130° C. until ammonia ceases to come off, reheating the reaction product at 185° C. for approximately four hours to drive off most of the nitrogen, leaving the resultant resin permanently fusible, reducing the temperature of the base stock thus formed to 150° C., slowly adding with good agitation metal particles in powder form, varying the proportion of the metal powder to the resin in accordance with the color of the resin to produce a desired metallic finish, the proportion of metal being less with light colored resins, cooling the mixture to 105° C., adding 15 parts of a 40 per cent solution of formaldehyde, ½ part hexamethylenetetramine and 3 parts aluminum stearate, strongly agitating the mixture to remove all water, cooling the mixture to 70° C. to harden the same, and then breaking and grinding the hardened composition to the desired mesh size of a molding mixture.

3. The method of making a molding composition which comprises initially preparing a base stock consisting of 103 parts of phenol and 14 parts of hexamethylenetetramine heated together at 130° C. until ammonia ceases to come off, reheating the reaction product at 185° C. for approximately four hours to drive off most of the nitrogen, leaving the resultant resin permanently fusible, reducing the temperature of the base stock thus formed to 150° C., slowly adding with good agitation metal particles in flake form varying the proportion of the metal powder to the resin in accordance with the color of the resin to produce a desired metallic finish, the proportion of metal being less with light colored resins, cooling the mixture to 105° C., adding 15 parts of a 40 per cent solution of formaldehyde, ½ part hexamethylenetetramine and 3 parts aluminum stearate, strongly agitating the mixture to remove all water, cooling the mixture to 70° C. to harden the same, and then breaking and grinding the hardened composition to the desired mesh size of a molding mixture.

WILLIAM P. ROUSH.

REFERENCES CITED

The following references are of record in the file of this patent:

UNITED STATES PATENTS

| Number | Name | Date |
|---|---|---|
| 1,054,265 | Baekeland | Feb. 25, 1913 |
| 1,160,362 | Baekeland | Nov. 16, 1915 |